(12) United States Patent
Liao

(10) Patent No.: US 7,656,142 B2
(45) Date of Patent: Feb. 2, 2010

(54) SWITCHING REGULATOR WITH VARIABLE SLOPE COMPENSATION

(75) Inventor: Chiawei Liao, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 546 days.

(21) Appl. No.: 11/180,556

(22) Filed: Jul. 14, 2005

(65) Prior Publication Data

US 2007/0013355 A1 Jan. 18, 2007

(51) Int. Cl.
  *G05F 1/00* (2006.01)
(52) U.S. Cl. .................. 323/288; 323/284; 323/285
(58) Field of Classification Search .................. 323/288, 323/282, 284, 285; 327/175
  See application file for complete search history.

(56) References Cited

U.S. PATENT DOCUMENTS

| | | | | |
|---|---|---|---|---|
| 4,399,412 | A * | 8/1983 | Rinaldi ........................ 327/38 |
| 4,837,495 | A * | 6/1989 | Zansky ........................ 323/222 |
| 4,975,820 | A * | 12/1990 | Szepesi .................. 363/21.17 |
| 5,450,036 | A * | 9/1995 | Nishioka et al. ............ 330/273 |
| 5,523,676 | A * | 6/1996 | Bach et al. ................ 324/103 P |
| 5,861,735 | A * | 1/1999 | Uchida ........................ 323/271 |
| 5,903,452 | A | 5/1999 | Yang |
| 5,929,620 | A * | 7/1999 | Dobkin et al. ............... 323/288 |
| 6,320,438 | B1 * | 11/2001 | Arcus ........................ 327/175 |
| 6,351,162 | B1 * | 2/2002 | Schwartz .................... 327/110 |
| 6,400,232 | B1 * | 6/2002 | Good et al. ................. 331/143 |
| 6,498,466 | B1 * | 12/2002 | Edwards ...................... 323/282 |
| 6,522,116 | B1 * | 2/2003 | Jordan ........................ 323/288 |
| 6,897,640 | B2 * | 5/2005 | Nebon et al. ................. 323/282 |
| 7,145,375 | B2 * | 12/2006 | Han ........................... 327/175 |
| 7,176,668 | B2 * | 2/2007 | Oswald et al. ............... 323/285 |
| 7,202,640 | B2 * | 4/2007 | Morita ........................ 323/205 |
| 2004/0095105 | A1 * | 5/2004 | Nakata ........................ 323/280 |
| 2006/0284607 | A1 * | 12/2006 | Isobe ......................... 323/282 |

OTHER PUBLICATIONS

Mac Lean, David, N. "A simplified Current Mode Control Model with Optimum Slope Compensation." Proceedings of the Intersociety Energy Conversion Engineering Conference, vol. 2, Aug. 12, 1990, pp. 37-42, XP010301332.
Sakurai, Hiroki. "Analysis and Design of a Current-Mode PWM Buck Converter Adopting the Output-Voltage Independent Second-Order Slope Compensation Scheme." IEICE Transactions Fundamentals of Electronics, Communications and Computer Sciences, Engineering Science Society, vol. E88-A, No. 2, Feb. 2005, pp. 490-497, XP001224568, ISSN: 0916-8508.
Holland, Barney. "Modelling, Analysis and Compensation of the Current-Mode Converter." Proceedings of Powercon. Annual International Power Electronics Conference, 1984, pp. 1-6, XP001057745.

* cited by examiner

*Primary Examiner*—Jessica Han
*Assistant Examiner*—Emily Pham
(74) *Attorney, Agent, or Firm*—McDermott Will & Emery LLP

(57) ABSTRACT

Controlled compensation for a switching regulator is attained by detecting switching duty cycle of the switching regulator, developing a compensation signal having a time duration that is related to the detected switching duty cycle percentage, and generating a duty cycle control signal for the regulator that is dependent in part on the developed compensation signal. The compensation signal has a slope profile and is initiated during each switching cycle at a set point in the cycle that is related to the switching duty cycle percentage,

12 Claims, 4 Drawing Sheets

SWITCHING REGULATOR WITH VARIABLE SLOPE COMPENSATION

TECHNICAL FIELD

This disclosure is related to switching regulators, and more particularly to compensating control of the switching duty cycle.

BACKGROUND

The use of current mode switching regulators to control a DC output voltage at a level higher than, lower than, or the same as an input voltage is well known. Typically, one or more switches are activated to supply current pulses via an inductor to charge an output capacitor. The output voltage level is maintained at a desired level by adjusting the on and off times of the switching pulses in accordance with output voltage and load conditions.

FIG. 1 is a block diagram of a typical current mode switching regulator. Switching control circuit 10 may comprise any of various known controllers that provide pulse width modulated output pulses to regulate a DC output voltage $V_{OUT}$ at a level that may be greater than, lower than, or the same as a nominal input voltage $V_{IN}$. Typically, the control circuit includes a latch, having set and reset inputs, coupled to a controlled switch that supplies switched current $I_{SW}$ to inductor 12. Capacitor 14 is connected between the output $V_{OUT}$ and ground. Resistors 16 and 18 are connected in series between $V_{OUT}$ and ground. A load 20 is supplied from the regulator output.

The set input is coupled to clock 22, which may generate pulses in response to an oscillator, not shown. During normal operation, the latch is activated to initiate a switched current pulse when the set input receives each clock pulse. The switched current pulse is terminated when the reset input receives an input signal, thereby determining the width of the switched current pulse. The reset input is coupled to the output of comparator 24. An output voltage feedback signal $V_{FB}$ is taken at the junction of resistors 16 and 18 and coupled to negative input of error amplifier 26. A voltage reference $V_{REF}$ is applied to the positive input of error amplifier 26. Capacitor 28 is coupled between the output of error amplifier 26 and ground.

The level of charge of capacitor 28, and thus its voltage $V_C$, is varied in dependence upon the output of amplifier 26. As load current increases, the output voltage, and thus $V_{FB}$, decreases. As the feedback voltage $V_{FB}$ decreases, $V_C$ increases. Thus, $V_C$ is proportional to load current. $V_C$ is coupled to the inverting input of comparator 24. The non-inverting input is coupled to adder 30. Adder 30 combines signal $I_{SW}$, which is proportional to the sensed switch current, with a compensation signal. Upon switch activation in response to a clock set signal, switch current builds through inductor 12. When the level of the signal received from adder 30 exceeds $V_C$, comparator 24 generates a reset signal to terminate the switched current pulse. During heavier loads $V_C$ increases and the switched current pulse accordingly increases in length to appropriately regulate the output voltage $V_{OUT}$. As $V_C$ is an indication of load, it can be monitored by internal circuitry, not shown, to detect light load conditions. In response to $V_C$ reaching a predetermined light load condition threshold, the operation can be changed to a "sleep mode," in which some circuit elements can be deactivated to consume power.

For normal regulator operation at duty cycles of fifty percent or higher, compensation is needed in the switching control to avoid sub-harmonic oscillation. A typical approach is termed "slope compensation," wherein a signal of increasing magnitude is added to the current signal $I_{SW}$, or subtracted from the signal $V_C$, during each switching cycle. FIG. 2 is a circuit diagram of a prior art slope compensation generator that may be input to adder 30 to modify the current signal applied to the non-inverting input of comparator 24. The output of the circuit is a current signal Sx corresponding to the current in the series circuit path of transistor 32, resistor 34 (R) and voltage bias (VB) source 36. The base of transistor 32 is coupled to the output of unity gain buffer amplifier 38. The positive input of amplifier 38 is coupled to receive a ramp signal Vramp. The negative input of amplifier 38 is coupled to the junction between transistor 32 and resistor 34.

FIG. 3 is a simplified waveform diagram illustrative of the compensation function of the circuit of FIG. 2. The Vramp signal is a sawtooth format signal that is generated at the beginning of each clock cycle and extends at linear slope to the end of the cycle, corresponding to one hundred percent duty cycle. As an example, the Vramp magnitude may vary between zero and one volt. Transistor 32 begins conduction at a point Ts in the cycle at which Vramp overtakes the fixed voltage VB. As compensation is needed at fifty percent duty cycle operation or greater, VB typically is arbitrarily chosen at one half the value of the maximum Vramp level, or one half-volt in the present example. As Vramp continues to increase after time Ts, the base signal applied to transistor 32 increases and, thus, the output current Sx increases linearly to a maximum Smax at the end of the switching cycle. Sx is determined by (Vramp−VB)/R. The compensation curve Sx starting point Ts is thus determined by VB, and its slope is determined by R. In this example Ts occurs at fifty percent of the switching cycle, regardless of the actual duty cycle.

Because this slope compensation curve starts at fifty percent of the switching cycle, the Sx builds up to a high level at a maximum duty cycle of one hundred percent. The high level of the compensation signal is disadvantageous at or near maximum duty cycle operation. The voltage $V_C$, the output of feedback amplifier 26 applied to the negative input of comparator 24, has the same value as the sum of the switch current $I_{SW}$ and the slope compensation signal Isx at the positive input of comparator 24 when the switched pulse terminates. As a high offset has been introduced, $V_C$ will not accurately indicate true output load current. At the high duty cycle operation, the switching current limit level is reduced. At higher duty cycle operation, the sleep mode threshold, based on $V_C$, will be inaccurate. The need thus exists for an improved compensation scheme that overcomes the drawbacks of the prior art slope compensation.

Disclosure

The above-described needs of the prior art are fulfilled, at least in part, by detecting switching duty cycle of a switching regulator, developing a compensation signal having a time duration that is related to the detected switching duty cycle, and generating a duty cycle control signal for the regulator that is dependent in part on the developed compensation signal. The compensation signal has a slope profile and is initiated during each switching cycle at a set point in the cycle that is related to the switching duty cycle.

The duty cycle may be detected by generating a repetitive pulse signal coordinated with the regulator switching, and integrating the pulse signal. The point in each cycle at which the compensation signal is initiated may be set by generating a ramp signal at the onset of each switching cycle, modifying the duty cycle signal, and comparing the repetitive ramp signal with the modified duty cycle signal. When the ramp signal is equal in magnitude to the modified duty cycle signal, the compensation signal commences. Preferably, the duty cycle signal is modified by offsetting the duty cycle signal by a fixed voltage.

In an exemplified implementation, a variable compensation circuit is coupled to an input of a switching controller input for terminating a switching pulse during each switching cycle. In a preferred configuration, an amplifier circuit output is coupled to the controller input. A ramp generator provides a ramp signal to an input of the amplifier circuit, and a variable offset circuit provides a variable offset signal to the amplifier input of the amplifier. The variable offset circuit is coupled in series with the amplifier circuit output. The amplifier output signal is proportional to the difference between the ramp signal and the variable offset signal. The compensation circuit thus outputs a signal that has an offset level that varies as a function of the duty cycle of the regulator switching operation.

The amplifier circuit may be configured with an amplifier having a positive input terminal coupled to the ramp generator, a negative input terminal coupled to the variable offset circuit, and an output. A control terminal of a transistor is coupled to the amplifier output. The transistor is coupled between the variable offset circuit and the amplifier circuit output. An impedance is coupled in series with the transistor, thereby determining the slope of the compensation circuit output signal.

The variable offset circuit may be exemplified by a duty cycle detection circuit and a constant offset voltage circuit, each coupled to an adder output circuit is coupled to the amplifier input. The duty cycle detection circuit may include an integrator circuit configured to receive a repetitive pulse signal that is coordinated with the regulator switching.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 4:
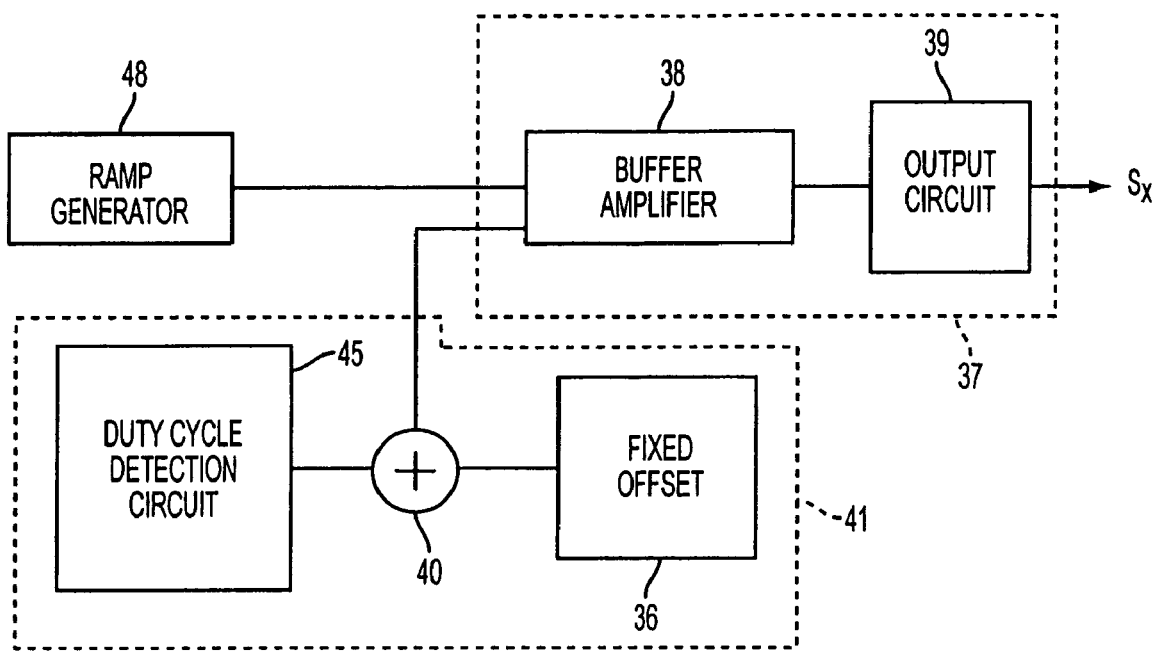
FIG. 4 is a block diagram exemplifying slope compensation in accordance with the present invention.

An underlying concept of the present disclosure is based on the realization that slope compensation is needed only at the instant when the regulator switch turns off. If the regulator of FIG. 2 of the prior art is operating at ninety percent duty cycle, for example, the build up of compensation signal starting at fifty percent is unnecessary until near the ninety percent point. By that time, a substantial offset signal magnitude has been developed. FIG. 4 is a block diagram of a variable compensation circuit that permits generation of the compensation signal to start in advance of the duty cycle by a fixed small value in each switching cycle. With this circuit, the operating duty cycle is sensed and the slope compensation signal is started only slightly before the regulator switch turns off. The unnecessary slope compensation over lower duty cycles is avoided. Sleep mode level can be detected more accurately. The magnitude of the slope compensation signal at switching pulse termination is at a level that does not significantly lower the switch current limit level.

Figure 1:
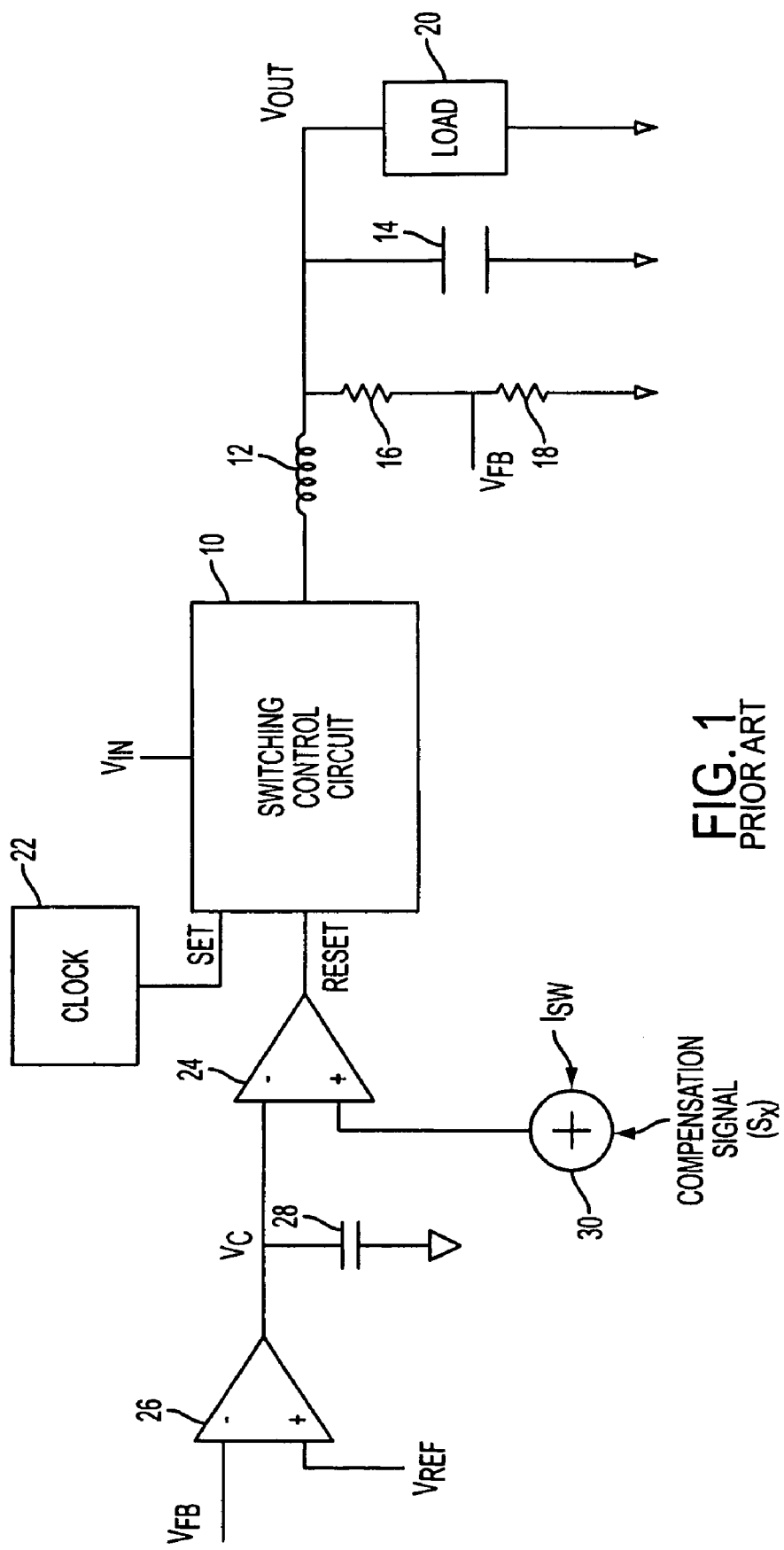
FIG. 1 is a block diagram of a typical current mode switching regulator.

Amplifier circuit 37 outputs a compensation signal Sx, having a constant slope, that may be coupled as an input to the adder 30 of FIG. 1. Buffer amplifier 38 receives a ramp signal from ramp generator 48. The ramp generator may comprise a well known capacitive circuit that is synchronized with a clock signal to provide a sawtooth type waveform having a constant slope. The buffer amplifier 38 receives a second signal from variable offset circuit 41, which adds, via summer 40, a fixed offset voltage from source 36 to a signal provided by duty cycle detection circuit 45. The output of duty cycle detection circuit 45 is proportional to the regulator duty cycle. The output of the circuit 41 is proportional to the regulator duty cycle offset by the fixed level of the source 36. The output circuit 39 initiates output signal Sx in each cycle when the ramp generator signal exceeds the signal received from variable offset circuit 41. The output signal Sx commences later in a switching cycle for higher duty cycle operation than for lower duty cycle operation and is thus variable with respect to its phase in the switching cycle. There is fixed phase difference between Sx and the operating duty cycle.

Figure 5:
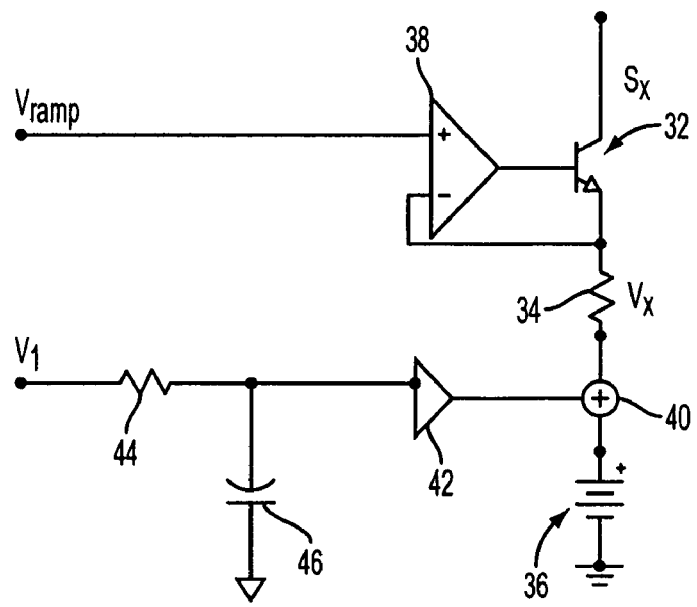
FIG. 5 is a circuit diagram of the slope compensation generator of FIG. 4.

FIG. 5 is a partial circuit diagram of the variable compensation circuit of FIG. 4. Transistor 32 is coupled in series with resistor 34 and adder 40. These elements form, in part, the output circuit 39 that produces the compensation signal Sx. A first input of adder 40 is coupled to fixed offset voltage 36. The second input of adder 40 is coupled to buffer 42. The input of buffer 42 is coupled to a junction between resistor 44 and capacitor 46. Buffer 42, resistor 44 and capacitor 46 form the duty cycle detection circuit 45. Voltage signal V1 is coupled to resistor 44. The positive input of amplifier 38 is coupled to receive a ramp signal Vramp. The negative input of amplifier 38 is coupled to the junction between transistor 32 and resistor 34.

Figure 6A:
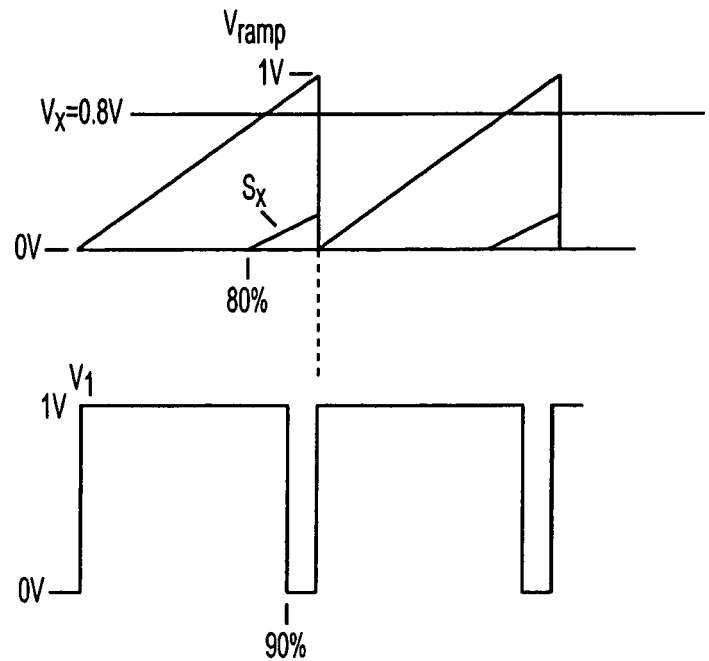
FIG. 6a is a waveform diagram illustrative of various signals of the circuit of FIG. 5.

Reference is made to the waveforms of FIG. 6a in describing the operation of the circuit of FIG. 5. For clarity of explanation, an example is taken in which the regulator is operating at a ninety percent duty cycle and in which the Vramp and V1 signals have upper and lower limits of one volt and zero volt, respectively. It should be understood that the regulator is capable of operation throughout the complete duty cycle range and that the voltage parameter ranges are subject to selection.

The V1 signal is a square signal that coincides with the regulator switching. As shown, V1 is at a level of one volt for ninety percent of the cycle and at zero the last ten percent. This signal is averaged by the integrator formed by resistor 44 and capacitor 46. The voltage at the junction of these two circuit elements thus is 0.9 volt at ninety percent duty cycle. This averaged voltage is buffered by buffer 42 and input to the adder 40 where it is added to the fixed voltage offset of voltage source 36 to provide a voltage Vx at the adder output. In this example, the fixed voltage offset has been selected at −0.1 volt. Vx is thus 0.8 volt. Prior to conduction of transistor 32, the voltages at both the transistor emitter and the negative input of amplifier 38 are at the level of Vx.

The Vramp signal is generated at the start of each clock cycle and increases linearly until the next clock. The slope of this signal is selected such that its magnitude corresponds in number with the duty cycle. That is, for example, Vramp at 0.5 volt occurs at fifty percent duty cycle. When the Vramp signal rises to the level of Vx, amplifier 38 will drive transistor 32 to conduction. As Vramp continues to increase, the voltage applied to the base of transistor 32 continues to increase and its conduction current, Sx, increases. In the illustrated example, the fixed offset voltage of source 36 has been chosen to be −0.1 volt, whereby Vx becomes 0.8 volt. As both voltage inputs to amplifier are equal at 0.8 v, the compensation signal is initiated at eighty percent duty cycle, as illustrated in FIG. 6a. The particular voltage offset selection has been made so that the slope compensation curve starts at only a small percent duty cycle ahead of the regulator operating duty cycle, ten percent in this example. If the duty cycle were to change to seventy percent, Vx would change to 0.6 volt and the compensation signal would commence at sixty percent duty cycle. When the transistor conducts, a voltage drop occurs across resistor 34. The value of resistor 34 is selected to set a slope of Sx so that it is suitable for compensation without reaching a high level having the drawbacks of the prior art.

Figure 2:
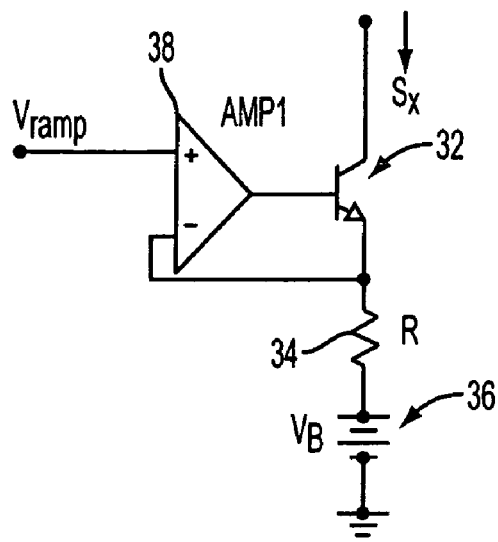
FIG. 2 is a circuit diagram of a prior art slope compensation generator.
Figure 3:
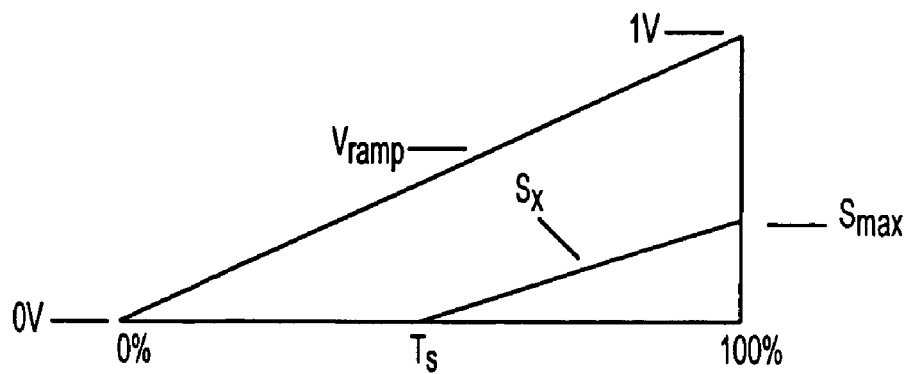
FIG. 3 is a simplified waveform diagram illustrative of the compensation function of the circuit of FIG. 2.
Figure 6B:
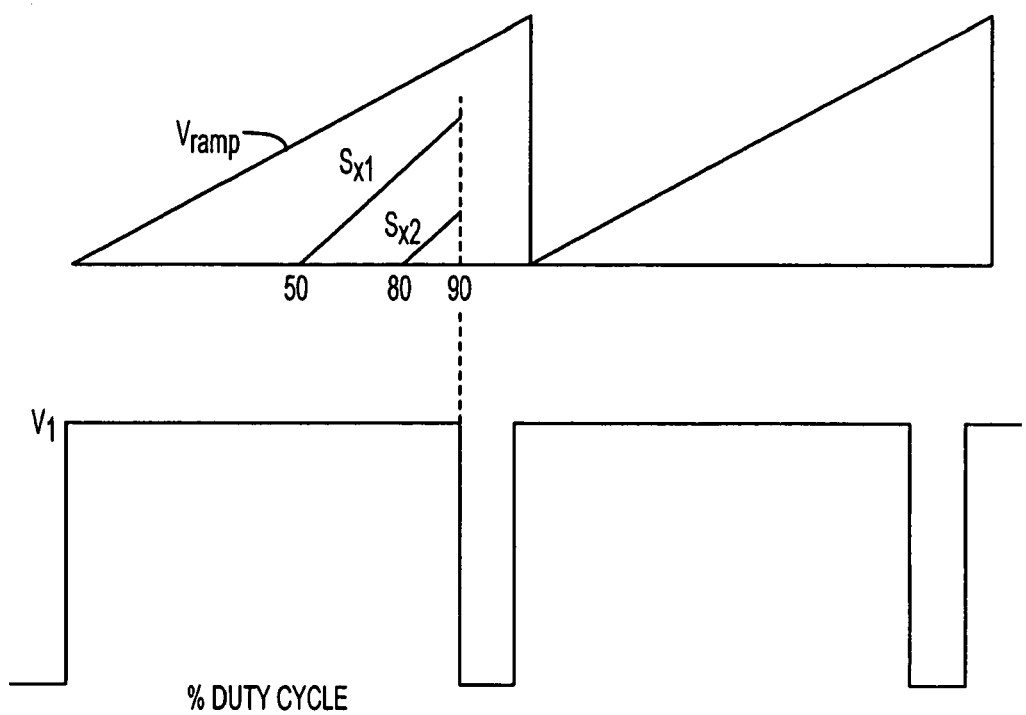
FIG. 6b is a waveform diagram in which the compensation signals of the circuits of FIGS. 2 and 5 are compared.

The waveform diagram of FIG. 6b is illustrative of the compensation signals produced by the prior art circuit of FIG. 2 and the circuit of FIG. 5 for ninety percent duty cycle operation, corresponding to the above described example. Compensation signal Sx1 of the FIG. 2 circuit commences at fifty percent duty cycle and builds up to a high level at ninety percent duty cycle at which point switch cutoff occurs. At this point, the output current of adder 30 is equal to $V_C$ and comprises a large Sx1 component. At the illustrated compensation signal slope, the Sx1 component appears to be approximately eighty percent of the magnitude of the Vramp signal and a significantly large value in comparison with the $V_C$ level. In contrast, compensation signal Sx2 of the circuit of FIG. 5 commences at eighty percent duty cycle with the same slope. At the ninety percent duty cycle cutoff, the Sx2 component of the output of adder 30 appears to be approximately twenty percent of the magnitude of the Vramp signal. As a result, the accuracy of $V_C$ as an indicator of output load current and the switching current limit level are greatly improved.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. The principles of the invention are applicable to a variety of voltage regulators, including buck, boost, and buck-boost regulators. By appropriate selection of the parameters of the resistor 34, the duty cycle detection elements, and the operating voltage levels, the slope of Sx and its onset in relation to duty cycle operation can be adjusted to desired levels.

What is claimed is:

1. A switching regulator, comprising:
    a switching controller having an input configured to receive a signal for terminating a switching pulse during a regulator switching cycle to establish a duty cycle of the switching regulator, and an output to which a load may be coupled; and
    a variable compensation circuit coupled to the controller input and including a duty cycle detection circuit for detecting the duty cycle of the switching regulator,
    the compensation circuit being configured to output a signal that varies as a function of a duty cycle signal produced by the duty cycle detection circuit,
    wherein the compensation circuit comprises:
        an amplifier circuit having an output coupled to the controller input;
        a ramp generator coupling a ramp signal to the amplifier circuit; and
        a variable offset circuit coupling a variable offset signal to the amplifier circuit;
    wherein an output signal of the amplifier circuit is proportional to the difference between the ramp signal and the variable offset signal.

2. A switching regulator as recited in claim 1, wherein the variable offset circuit is coupled in series with the amplifier circuit output.

3. A switching regulator as recited in claim 2, wherein the amplifier circuit comprises:
    an amplifier having a positive input terminal coupled to the ramp generator, a negative input terminal coupled to the variable offset circuit, and an output; and
    a transistor having a control terminal coupled to the amplifier output;
    wherein the transistor is coupled between the variable offset circuit and the amplifier circuit output.

4. A switching regulator as recited in claim 3, wherein the amplifier circuit further comprises an impedance coupled in series with the transistor; and
    the compensation circuit output signal has a slope that is fixed in accordance with the value of the impedance and is repeated in each switching cycle.

5. A switching regulator as recited in claim 1, wherein the variable offset circuit comprises:
    the duty cycle detection circuit;
    a constant offset voltage circuit; and
    an adder having a first input coupled to the duty cycle detection circuit, a second input coupled to the constant voltage circuit, and an output circuit coupled to the amplifier input.

6. A switching regulator as recited in claim 5, wherein the duty cycle detection circuit comprises:
    an integrator circuit configured to receive a repetitive pulse signal that is synchronized with the regulator switching.

7. In a switching regulator, a method comprising:
    detecting a switching duty cycle of the regulator;
    developing a ramp-shaped compensation signal that commences at a first value of the detected switching duty cycle and reaches maximum magnitude at a second value of the detected switching duty cycle; and
    generating a duty cycle control signal for the regulator that is dependent in part on the developed compensation signal,
    wherein the compensation is repeated in each switching cycle of the regulator and the duration of the compensation signal in each switching cycle is related to the detected switching duty cycle.

8. In a switching regulator, a method comprising:
    detecting a switching duty cycle of the regulator;
    developing a ramp-shaped compensation signal that commences at a first value of the detected switching duty cycle and reaches maximum magnitude at a second value of the detected switching duty cycle; and generating a duty cycle control signal for the regulator that is dependent in part on the developed compensation signal, wherein the compensation signal comprises a slope profile and the step of developing comprises initiating the compensation signal during each switching cycle at a set point in the cycle that is related to the switching duty cycle.

9. In a switching regulator, a method comprising:

detecting a switching duty cycle of the regulator;

developing a compensation signal that is related to the detected switching duty cycle; and generating a duty cycle control signal for the regulator that is dependent in part on the developed compensation signal, wherein the compensation signal has a ramp shape, the step of developing comprises initiating the compensation signal during each switching cycle at a set point in the cycle that is related to the switching duty cycle, and the step of detecting comprises:

generating a repetitive pulse signal in accordance with regulator switching; and integrating the pulse signal to obtain a signal indicative of duty cycle.

10. A method as recited in claim 9, wherein the step of initiating comprises:

generating a ramp signal at the onset of each switching cycle;

modifying the duty cycle signal; and comparing the repetitive ramp signal with the modified duty cycle signal;

wherein the set point is the point in each switching cycle at which the ramp signal is equal in magnitude to the modified duty cycle signal.

11. A method as recited in claim 10, wherein the step of modifying comprises offsetting the duty cycle signal by a fixed amount.

12. A method as recited in claim 10, further comprising the step of fixing the slope of the compensation signal.

* * * * *

UNITED STATES PATENT AND TRADEMARK OFFICE
CERTIFICATE OF CORRECTION

PATENT NO. : 7,656,142 B2  Page 1 of 1
APPLICATION NO. : 11/180556
DATED : February 2, 2010
INVENTOR(S) : Chiawei Liao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Thirtieth Day of November, 2010

David J. Kappos
*Director of the United States Patent and Trademark Office*